United States Patent
Lee et al.

(10) Patent No.: US 7,754,278 B2
(45) Date of Patent: Jul. 13, 2010

(54) MAGNETIC POLYMER MICROBEADS AND METHOD FOR PREPARING THE SAME

(75) Inventors: Wen-Chien Lee, Chiayi (TW); Ting-Hao Chung, Taichung (TW)

(73) Assignee: National Chung Cheng University, Min-Hsiung (TW)

( * ) Notice: Subject to any disclaimer, the term of this patent is extended or adjusted under 35 U.S.C. 154(b) by 1246 days.

(21) Appl. No.: 11/299,800

(22) Filed: Dec. 13, 2005

(65) Prior Publication Data

US 2006/0130192 A1    Jun. 15, 2006

(30) Foreign Application Priority Data

Dec. 14, 2004   (TW) .................................. 93138774

(51) Int. Cl.
*B05D 7/00* (2006.01)
(52) U.S. Cl. ...................................... 427/129; 427/212
(58) Field of Classification Search ................. 427/129, 427/181, 222, 307; 252/62.54, 62.55, 62.56
See application file for complete search history.

(56) References Cited

U.S. PATENT DOCUMENTS

| | | | |
|---|---|---|---|
| 3,750,688 A * | 8/1973 | Hall et al. ..................... 137/2 |
| 4,238,558 A * | 12/1980 | Ziolo ...................... 430/111.3 |
| 4,267,234 A | 5/1981 | Rembaum |
| 4,358,388 A | 11/1982 | Daniel et al. |
| 4,452,773 A | 6/1984 | Molday |
| 4,454,234 A | 6/1984 | Czerlinski |
| 4,554,088 A | 11/1985 | Whitehead et al. |
| 4,783,336 A | 11/1988 | Margel et al. |
| 4,795,698 A | 1/1989 | Owen et al. |
| 5,091,206 A | 2/1992 | Wang et al. |
| 5,320,944 A | 6/1994 | Okada et al. |
| 5,648,124 A | 7/1997 | Sutor |
| 6,204,033 B1 | 3/2001 | Muller-Schulte |
| 2007/0111002 A1 * | 5/2007 | Xia et al. ..................... 428/407 |

* cited by examiner

*Primary Examiner*—Michael Cleveland
*Assistant Examiner*—Robert Vetere
(74) *Attorney, Agent, or Firm*—Birch, Stewart, Kolasch & Birch, LLP (57) ABSTRACT

Magnetic polymer microbeads and a method for preparing the same are provided. The method for preparing the magnetic polymer microbeads includes the following steps: preparing polymer particles; immersing the polymer particles into a solution in order to swell the polymer particles; adding magnetic nanoparticles to the solution and allowing the magnetic nanoparticles to enter an interior of the polymer particles; and separating the polymer particles from the solution, wherein the polymer particle is made of polystyrene, or a copolymer containing styrene, and the solution includes a medium polar solvent. The average particle size of the magnetic polymer microbeads of the present invention ranges from submicrons to microns. The magnetic polymer microbeads of the present invention have high magnetization, and the various functional groups can be introduced onto the surfaces thereof. Therefore, the magnetic polymer microbeads of the present invention can be applied in many areas, and thereby they have high economic value.

19 Claims, 10 Drawing Sheets

MAGNETIC POLYMER MICROBEADS AND METHOD FOR PREPARING THE SAME

BACKGROUND OF THE INVENTION

1. Field of the Invention

The present invention relates generally to magnetic polymer microbeads, and a method for preparing the same, and in particular to the magnetic polymer microbeads prepared by swelling the polymer particles with a solvent, and then encapsulating the magnetic nanoparticles in the polymer particles, and a method for preparing the same

2. The Prior Arts

In recent years, the magnetic bioseparation technology has been widely applied in biological-related areas, such as the separation and purification of cells, DNA, RNA, antibodies, antigens, and proteins. The magnetic polymer microbeads are widely applied in the magnetic bioseparation for clinic testing, and function as the carriers for such as, the enzyme immobilization, bacterial separation, cell separation, and the separation of nucleic acid and protein. The magnetic polymer microbeads can also be used as the carriers of the medicines and gene delivery. In addition, the magnetic polymer microbeads can also be used as the magnetic carbon powders, magnetic inks, magnetic coatings, and the like.

In the application of the magnetic cell separation, the average particle size of the magnetic polymer microbeads used for antibody immobilization ranges from nanometers to microns. The magnetic polymer microbeads are now commercially available from (1) Dynal Biotech., Norway, known as Dynabeads® which are made of polystyrene, and have an average particle size of about 2.8 µm. The antibody-immobilized magnetic Dynabeads can selectively bind the specific cells, and thereafter, the isolation is effected by the magnetic field, and finally the linkage between the antibodies on the magnetic Dynabeads and the antigens on the cells is cleaved by the enzyme; (2) BD Bioscience, the United States, known as BD™Mag magnetic polymer microbeads which have a particle size ranging from nanometers to microns (about 0.1 to 0.45 µm). The magnetic polymer microbeads carrying monoclonal antibody can bind the specific cell, and followed by separation by BD Imagent, or magnetic separator; (3) Seradyn Inc., the United States, known as Sera-Mag™ beads which have an average particle size of about 1 µm; (4) Polysciences, Inc. the United States, known as BioMag® beads which have an average particle size of about 1 µm, and consist of an iron oxide core with a silane coating; (5) Polysciences, Inc. the United States, known as estapor® superparamagnetic microspheres which have an average particle size ranging from submicrons to microns.

The methods for preparing the above-mentioned magnetic polymer microbeads can generally be divided into two categories: (1) the magnetic material core is surrounded by the polymer coat; and (2) the magnetic materials are evenly dispersed within the polymer matrix, or are filled in the pores of the polymer matrix. Conventionally, in the case of the magnetic core material surrounded by a polymer, the magnetic metal nanoparticles are surrounded by silane coat to form the magnetic polymer microbeads with the average particle size of about 0.1-10 µm, which are mainly used in immunosorbant assays. However, the magnetic metal nanoparticles can also be surrounded by non-silane coat. For example, the U.S. Pat. No. 4,267,234 disclosed that a magnetic metal nanoparticle was surrounded by a polyglutaraldehyde coat, and the aldehyde groups on the polymer can readily be used to immobilize the proteins, such as antibodies, or antigens. The U.S. Pat. No. 4,454,234 disclosed that acrylamide, n-butylacrylate, N,N'-methylenebisacrylamide, and the magnetic particles of $LaMn_2Ge_2$ were mixed together, and polymerized at 37° C. to form the submicron-sized magnetic polymer microbeads. Then, the magnetic polymer microbeads were modified, wherein the ester groups on the polymer were converted to carboxyl groups, or acid amide groups, and which were used to bond to proteins. U.S. Pat. No. 4,554,088 disclosed that the magnetic polymer microbeads were prepared by surrounding $Fe_3O_4$ core with a silane coat, and then chemically modified using diazotization, carbodiimide or glutaraldehyde. Such magnetic polymer microbeads were applied in bioseparation because they could couple with the antibodies for uses in bioseparation. U.S. Pat. No. 4,783,336 disclosed that the magnetic polymer microbeads were prepared by surrounding a magnetic $Fe_3O_4$ core with a polyacrolein coat. U.S. Pat. No. 6,204,033 disclosed that the magnetic polymer microbeads were prepared by surrounding a ferromagnetic or superparamagnetic material with a polyvinyl alcohol coat. U.S. Pat. Nos. 4,452,773 and 4,795,698 disclosed that the magnetic polymer microbeads were prepared by coating a magnetic $Fe_3O_4$ core with a natural polymer (such as dextran) and bovine serum albumin (BSA), respectively. All the above-mentioned patents disclosed that the magnetic polymer microbeads were prepared by surrounding magnetic particles with polymer coats so that the magnetic particles were used as core of the magnetic polymer microbeads, and the polymers having the functional groups were used as coat. However, although the magnetic polymer microbeads could be prepared according to the above-mentioned methods, the particle shapes and sizes of the magnetic polymer microbeads are not easily controlled, and the distribution of the particle diameters of the magnetic polymer microbeads is relatively broad, and the magnetic polymer microbeads look irregular, and tend to agglomerate.

In order to solve the above-mentioned problems, other methods involving evenly dispersing the magnetic metal materials within the polymer matrix were provided. In such methods, the monomers and the magnetic material were mixed together, and then polymerized to obtain the magnetic polymer microbeads. For example, U.S. Pat. No. 4,358,388 disclosed that the magnetic polymer microbeads are prepared by the suspension polymerization (oil in water). In this method, the monomers, the magnetic metal nanoparticles ($Fe_3O_4$), the initiator, and the solvent were mixed together, emulsified and suspended in an organic phase, and then poured into a water phase to undergo the polymerization, and finally the magnetic polymer microbeads in which the magnetic nanoparticles are evenly dispersed were obtained. In addition to the method of polymer coating on magnetic core, magnetic polymer microbeads can be made by a converse manner, i.e., forming a layer of magnetic material on polymer particles. U.S. Pat. No. 5,320,944 disclosed that the magnetic polymer microbeads used for immunoassay were obtained by coating the polystyrene particle with iron, cobalt, or nickel oxide type magnetic material. U.S. Pat. No. 5,091,206 disclosed that the metal oxide $Fe_3O_4$ was mixed with monomers and coated onto the polystyrene core, and then the polystyrene core was surrounded by another polymer formed after polymerizing the monomers, and thereby the surface of the new formed particle had the $Fe_3O_4$ magnetic materials. Moreover, the method for preparing the aforementioned Sera-Mag™ particles is another typical method. For example, U.S. Pat. No. 5,648,124 disclosed that the magnetic polymer microbeads were prepared by filling the magnetic material in the pores of the pre-prepared spherical polymer particles with a narrow distribution of particle sizes. Similarly, U.S. Pat. No. 4,654,267 disclosed that a porous polymer microparticles were prepared from the monomers of methyl methacrylate, glycidyl methacrylate, and the like, and then the porous polymer microparticles were evenly mixed with iron(II, III) salts (which could be used to prepare $Fe_3O_4$) or the material for making other magnetic particles, and then ammonium hydroxide solution was added therein, and the mixture was heated so that the $Fe_3O_4$ particles could be made within the pores of the polymer. However, the amount of the magnetic nanoparticle, incorporated in the porous polymer microparticls prepared from various monomers using such a method, was varied with the monomers used in the polymerization, and the magnetic nanoparticle content in the particles was found to be about 5-20%.

In the above U.S. Pat. No. 4,654,267, the magnetic polymer microbeads having spherical shape, narrow particle size distribution, and good quality were obtained. However, the method has its limitation because the magnetic materials need to be prepared in situ within the pores of the polymer particles. For example, in order to produce the magnetic particles, the precursor of the magnetic material and the reaction reagent have to diffuse into the pores of the polymer particle, and contact with each other in the pores of the polymer. In such a method, the magnetization of the magnetic polymer microbeads cannot reach to a much higher level because the choice of the magnetic materials is limited, and the total amount of the magnetic material incorporated in the magnetic polymer microbead (the magnetic moment per unit volume of particle) have their limit.

SUMMARY OF THE INVENTION

In order to overcome such shortcomings of the related art, the primary objective of the present invention is to provide a method for preparing the magnetic polymer microbeads with various magnetic materials.

Another objective of the present invention is to provide a method for preparing the magnetic polymer microbeads with high magnetization.

A further objective of the present invention is to provide a method for preparing the magnetic polymer microbeads, which is simple, and can diversify the range of products.

In order to achieve the above-mentioned objectives, the present invention provides a method for preparing magnetic polymer microbeads, comprising the following steps:
(1) preparing the polymer particles, and immersing the polymer particles into a solution in order to swell the polymer particles;
(2) adding the magnetic nanoparticles to the solution and allowing the magnetic nanoparticle to enter the interior of the polymer particles; and
(3) separating the polymer particles from the solution, wherein the polymer particles are made of polystyrene, or a copolymer containing styrene, and the solution includes a medium polar solvent which is miscible with water and most of the organic solvents, and the polar parameter of Hansen solubility parameters of the solvent is between 2 and 12 $(cal/cm^3)^{1/2}$, and the hydrogen bonding parameter thereof is between 2 and 8 $(cal/cm^3)^{1/2}$.

A variety of the magnetic nanoparticles can be chosen because the magnetic nanoparticles are pre-prepared. The magnetic nanoparticles with high magnetization can be chosen in the present invention in order to produce the magnetic polymer microbeads with high magnetization. The magnetic polymer microbeads of the present invention have the magnetic property, and a number of different functional groups can be introduced onto the surfaces thereof. Therefore, the magnetic polymer microbeads of the present invention can be applied in many areas, and thereby they have high economic value.

The magnetic polymer microbeads of the present invention can be applied in clinic testing assays (such as immunosorbant assays, chemiluminescence assays, and radiation assays), molecular biology, microbiology, virology, and high-throughput screening, and the like.

These and other objectives and functions of the present invention will be apparent to those skilled in the art by reading the following detailed description of a preferred embodiment thereof, with reference to the attached drawings.

DETAILED DESCRIPTION OF THE PREFERRED EMBODIMENT

Figure 1:
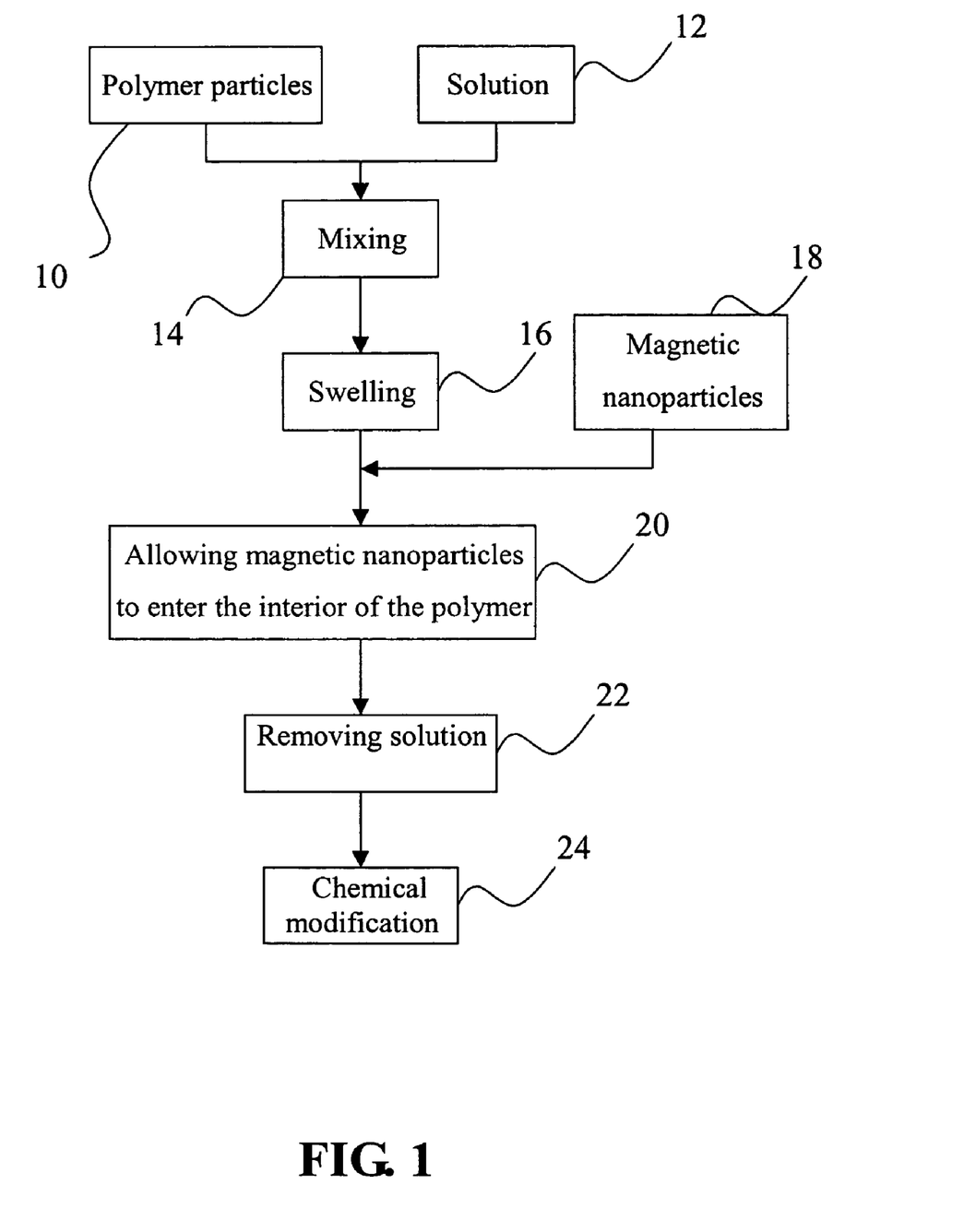
FIG. 1 is a flow chart of the steps required to prepare the magnetic polymer microbeads according to the present invention.

FIG. 1 is a flow chart of the steps required to prepare the magnetic polymer microbeads of the present invention. Referring to FIG. 1, the polymer particles 10 (herein also referred to as the seeds) are prepared, and thereafter the polymer particles 10 are mixed 14 with a solution 12, and the polymer particles 10 swell 16 when the solution enters the interior of the polymer particles 10. The volumes of the polymer particles are enlarged when swelling occurs. Subsequently, the magnetic nanoparticles are added to the solution containing the polymer particles, and evenly dispersed. Portions of the magnetic nanoparticles can enter the interior of the polymer particles 20 during dispersing.

The particle diameters of the polymer particles used in the present invention are not especially limited, as long as the particle diameters of the polymer particles are larger than those of the magnetic nanoparticles, but they are preferably from submicrons to microns, that is, between 0.1 μm and 100 μm. There are no particular restrictions regarding the kinds of the polymer particles used in the present invention, and the polymer particles can be prepared by different polymerization methods, such as emulsion polymerization, emulsifier-free emulsion polymerization, dispersion polymerization, or suspension polymerization. The polymer particles having different particle diameters, different particle diameter distributions, and different pore sizes can be prepared. The dispersion polymerization, for example, is a simple method for preparing the polymer particles having uniform particle diameters, and the polymer particles having micron sizes, narrow particle diameter distribution, and non-porosity. In the dispersion polymerization, the monomers, the initiator, and the stabilizer are initially dissolved in an organic solvent in a continuous phase, and then the polymerization is performed to obtain the polymer products. The obtained polymers will precipitate because they are immiscible with the solution. Such a polymerization is regarded as a solution polymerization at the beginning. The stabilizer is used as a steric stabilizer, which can prevent flocculation and aggregation of the particles being formed, and as well is used for controlling the particle diameters of the polymer particles. Moreover, the particle diameters of the polymer particles prepared by the emulsion polymerization, or the emulsifier-free emulsion polymerization are relatively small (in the range of submicrons). The polymer particles are preferably non-porous, or the pore sizes of the polymer particles are smaller than the particle diameters of the magnetic nanoparticles so that the magnetic nanoparticles encapsulated in the polymer particles of the present invention cannot run off. However, those having ordinary skill in the art will appreciate that the pore sizes of the polymer particles can be larger than the particle diameters of the magnetic nanoparticles after the polymer particles have been chemical modified, and the modified polymer particles is able to catch the magnetic nanoparticles, and thereby the magnetic nanoparticles encapsulated in the polymer particles can not run off. The polymer particles of the present invention are preferably polystyrene, or the copolymers of styrene and at least one monomer other than styrene, wherein the monomer is preferably a vinyl monomer with at least one functional group selected from the group consisting of carboxyl, hydroxyl, amide, amino, aldehyde, and oxirane.

Furthermore, the magnetic nanoparticles used in the present invention are not especially limited, and any magnetic nanoparticles made by the conventional methods can be used. However, if the magnetic nanoparticles having relatively high magnetization are used, the magnetic polymer microbeads having relatively high magnetization can be produced. Moreover, if the concentration of the magnetic nanoparticles is high, the number of the magnetic nanoparticles encapsulated by the polymer particle is increased. That is, the number of the magnetic nanoparticles encapsulated by per unit volume of the polymer particle is increased. Therefore, the magnetic polymer microbeads having relatively high magnetization can be obtained. Furthermore, if the magnetic nanoparticles encapsulated by the polymer particle are superparamagnetic, the obtained magnetic polymer microbeads are also superparamagnetic. Moreover, the materials of the magnetic nanoparticles used in the present invention are not especially limited, and these materials include, but not limited to, iron oxide, ferromagnetic oxide, ferromagnetic nickel, ferromagnetic cobalt, iron-cobalt-nickel alloy, iron carbide, and iron-platinum alloy. The above-mentioned iron oxide includes, but not limited to, $Fe_3O_4$, or $Fe_2O_3$. The above-mentioned ferromagnetic oxide includes, but not limited to, $MnZnFe_2O_4$, or $NiZnFe_2O_4$. Also, the magnetic nanoparticles can be made as a colloid solution to add to the polymer solution, and the colloid solution is miscible with the polymer solution.

The solution used in the present invention can allow the polymers to swell, but not to be dissolved therein, and as well it can allow the magnetic nanoparticle to be evenly dispersed therein. The solution includes a medium polar solvent which is miscible with water and most of the organic solvents. Examples of the solution include, but are not limited to, a single solvent, a mixture of several solvents, or a mixture of solvents and water. The solvent preferably has low biotoxin, and the polar parameter of Hansen solubility parameters of the solvent is preferably between 2 and 12 $(cal/cm^3)^{1/2}$, and more preferably between 5 and 9 $(cal/cm^3)^{1/2}$, and the hydrogen bonding parameter thereof is preferably between 2 and 8 $(cal/cm^3)^{1/2}$, and more preferably between 3 and 6 $(cal/cm^3)^{1/2}$. The solvents used in the present invention are preferably dipolar aprotic solvents, and examples of the solvents include, but are not limited to, dimethylsulfoxide (the value of the polar parameter is 8.0 $(cal/cm^3)^{1/2}$, and the value of the hydrogen bonding parameter is 5.0 $(cal/cm^3)^{1/2}$), N-methyl-2-pyrrolidone (the value of the polar parameter is 6.0 $(cal/cm^3)^{1/2}$, and the value of the hydrogen bonding parameter is 3.5 $(cal/cm^3)^{1/2}$), dimethylformamide (the value of the polar parameter is 6.7 $(cal/cm^3)^{1/2}$, and the value of the hydrogen bonding parameter is 5.5 $(cal/cm^3)^{1/2}$), and dimethylacetamide (the value of the polar parameter is 5.6 $(cal/cm^3)^{1/2}$, and the value of the hydrogen bonding parameter is 5.0 $(cal/cm^3)^{1/2}$).

Finally, the obtained magnetic polymer microbeads are separated from the solution by removing the solution 22, and the magnetic nanoparticles which are not encapsulated in the polymer particles are washed away, and then the remaining solution contained in the magnetic polymer microbeads are further removed by, for example, vacuum drying. After that, the magnetic polymer microbeads shrink after removing the solution therefrom, which render the magnetic polymer microbeads nonporous or porous with very small pore sizes. As a result, the magnetic nanoparticles encapsulated in the polymer particles cannot move away from the polymer particles. By such a method, the magnetic polymer microbeads of the present invention are obtained.

In order to make wide application of the present invention, the magnetic polymer microbeads can be modified 24 to carry the desired surface functional groups by the conventional methods, or can be coated with a layer of material with the desired functional groups. It is apparent to a person skilled in the art that the polymer particles with the predetermined functional groups can be prepared by copolymerizing the various monomers with the predetermined functional groups, followed by the above-mentioned steps. By such a way, the magnetic polymer microbeads having the predetermined functional groups can also be obtained.

It is apparent to a person skilled in the art that either magnetic or non-magnetic nanoparticles can be encapsulated in the polymer particles according to the present invention. Examples of the non-magnetic nanoparticles include, but are not limited to, quantum dots, carbon nanocapsules, dendrimers, or fluorescent molecules.

EXAMPLE 1

1 g of polystyrene particles (prepared by dispersion polymerization), 20 ml of N-methyl-2-pyrrolidone (the value of the polar parameter is 6.0 $(cal/cm^3)^{1/2}$, and the value of the hydrogen bonding parameter is 3.5 $(cal/cm^3)^{1/2}$), 120 ml of deionized water, and 0.1 g of sodium dodecyl sulfate (dispersing agents) are added to an Erlenmeyer flask under stirring, and then is left soaking for 15 hours at room temperature.

Moreover, the magnetic nanoparticles are prepared by coprecipitation method. The iron(II) and the iron(III) ions in molar ratio of 1:2 are mixed in an Erlenmeyer flask under stirring at 300 rpm, and 1 M NaOH solution is used to adjust the pH of the mixture to 12, and then the mixture is allowed to react at 60° C. for 1 hour, cooled in an ice bath, and centrifuged at 3,000 rpm (~2,500×g) to collect the black precipitate. Then, the black precipitate is immersed in 1N HCl solution for 1.5 hours. Finally, the precipitate is collected by centrifuging. The precipitate is then dispersed in deionized water to obtain the magnetic nanoparticles ($Fe_3O_4$) with average particle size of about 10 nm.

10 ml of 19 mg/ml $Fe_3O_4$ magnetic nanoparticle solution prepared above is added to the polystyrene solution prepared above at 30° C. with stirring (at 140 rpm) for 24 hours in order to allow the magnetic nanoparticles to enter the interior of the polystyrene particles.

Figure 2:
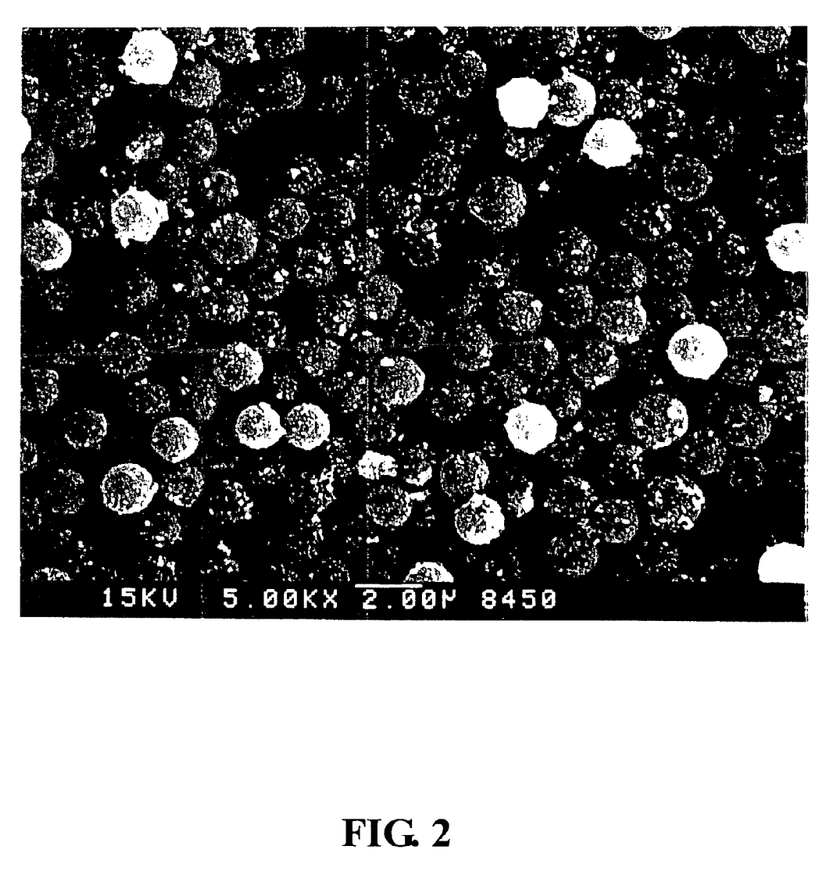
FIG. 2 shows the scanning electron micrograph with magnification of 5,000 times taken from the magnetic polymer microbeads according to one embodiment (Example 1) of the present invention, and it shows that the microbeads are spherical, and the distribution of the particle diameters is quite narrow.
Figure 3:
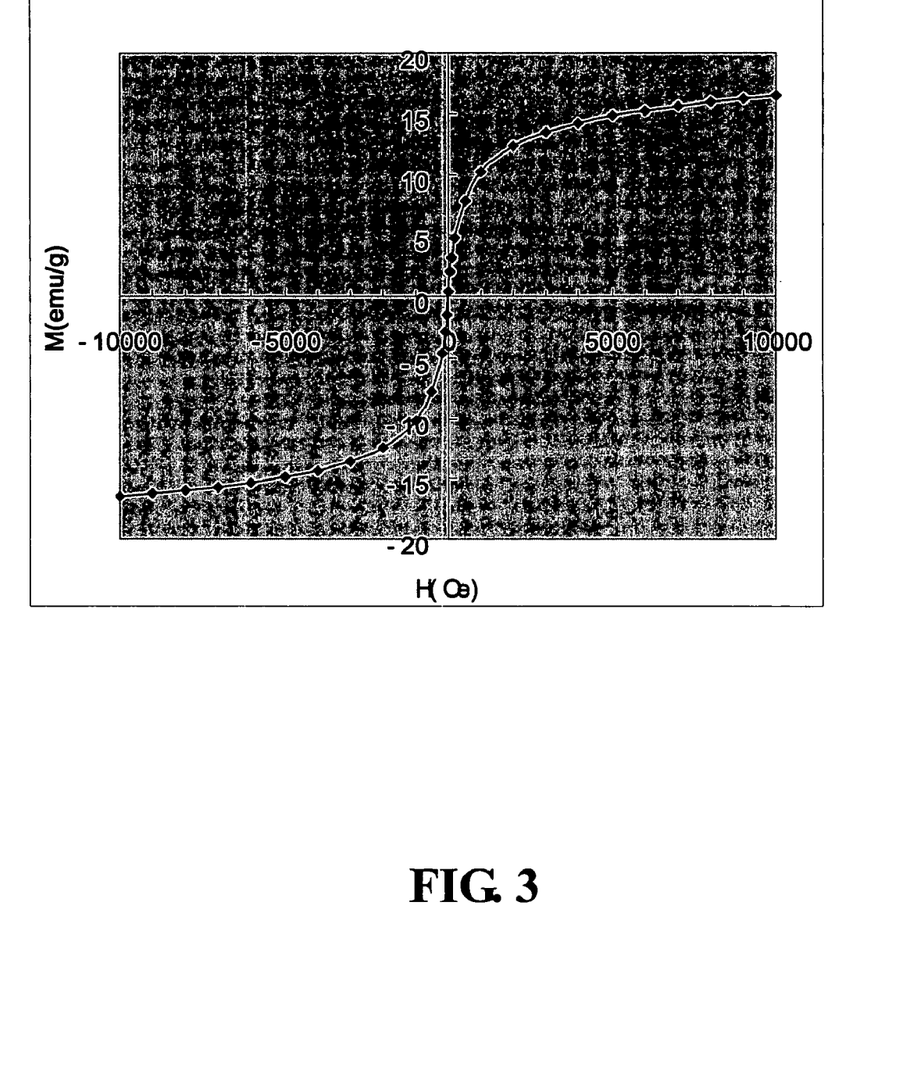
FIG. 3 shows the magnetization curve of the magnetic polymer microbeads shown in FIG. 2.

Afterwards, the polystyrene particles are separated from the solution by centrifuging, sequentially washed three times with methanol and three times with distilled water, and dried by vacuum drying at room temperature for 1-2 days to obtain the magnetic polymer microbeads. FIG. 2 shows the scanning electron micrograph of the magnetic polymer microbeads according to this embodiment. The average particle diameter of the magnetic polymer microbeads is found to be 1.6 μm. FIG. 3 shows the magnetization curve of the magnetic polymer microbeads according to this embodiment, and the saturation magnetization are found to be up to 16.4 emu/g which is higher than those of some commercially available magnetic polymer microbeads.

The surfaces of the obtained magnetic polymer microbeads have the hydrophobic benzene rings which can bind the proteins or other biomolecules by hydrophobic interaction.

EXAMPLE 2

Following the same procedure as Example 1, four separate sets of polystyrene solutions are prepared. Each set of polystyrene solutions is prepared as following: 0.1 g of polystyrene particles (prepared by dispersion polymerization), 20 ml of N-methyl-2-pyrrolidone, and 15 ml of deionized water are added to an Erlenmeyer flask under stirring, and then is left soaking for 24 hours at room temperature.

Figure 4:
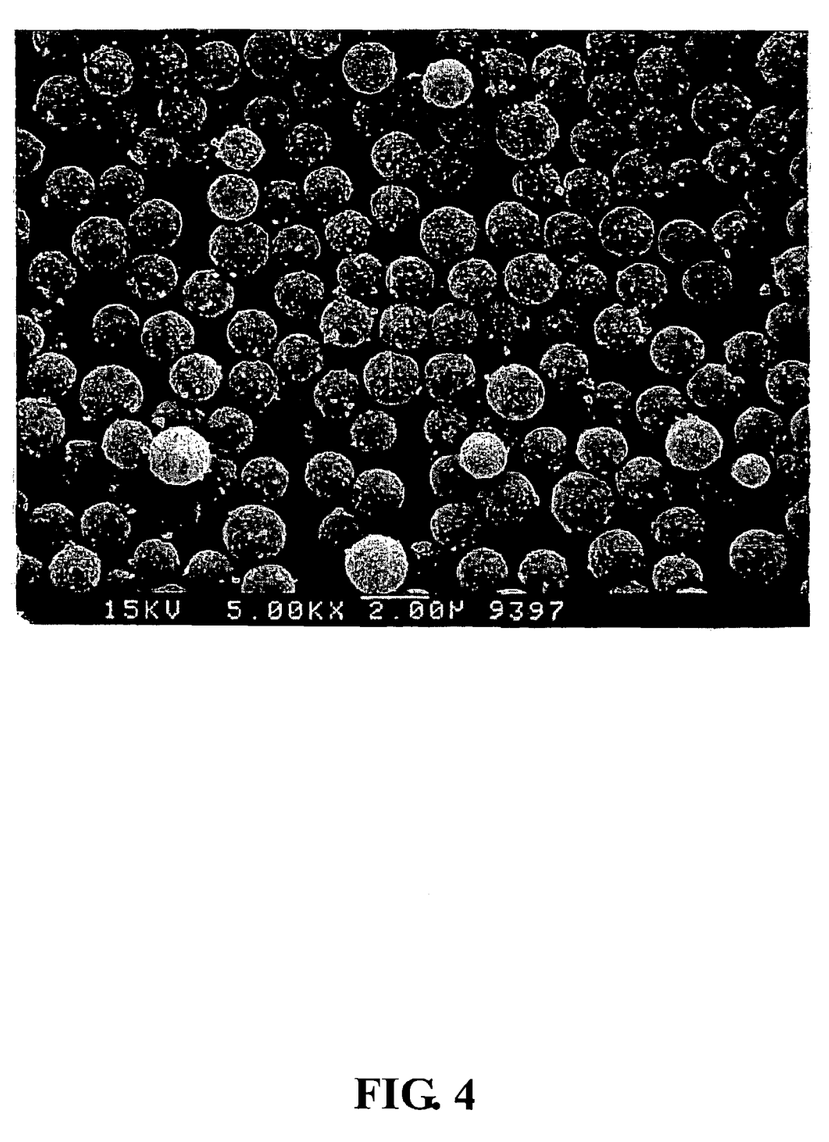
FIG. 4 shows the scanning electron micrograph with magnification of 5,000 times taken from the magnetic polymer microbeads according to another embodiment (Example 2) of the present invention, and it shows that the microbeads are spherical, and the distribution of the particle diameters is quite narrow.

Subsequently, 2.5 ml of 24 mg/ml $Fe_3O_4$ magnetic nanoparticle solution prepared from Example 1 is added to each of the three polystyrene solutions prepared above with stirring (at 140 rpm) for 24, 48, 72, or 120 hours, respectively (4 sets) in order to allow the magnetic nanoparticles to enter the interior of the polystyrene particles. Afterwards, the polystyrene particles are separated from the solution by centrifuging, washed six times with methanol and three times with deionized water, and dried by vacuum drying at room temperature for 1-2 days to obtain the magnetic polymer microbeads. In comparison with the saturation magnetizations obtained from the magnetization curves for the four sets, it is found that the magnetization of the obtained magnetic polymer microbeads is proportional to the length of time for immersing the polymer particles in the magnetic nanoparticle solution. The saturation magnetization of the magnetic polymer microbeads for the four sets (respectively corresponding to 24, 48, 72, and 120 hours of stirring) is respectively 2.4, 5.0, 9.4, and 14.6 emu/g. FIG. 4 shows the scanning electron micrograph of the magnetic polymer microbeads with the saturation magnetization of 9.4 emu/g.

EXAMPLE 3

1 g of the magnetic polymer microbeads prepared from Example 1 are added to a mixed solution of 100 ml distilled water and 50 ml acetonitrile, fully dispersed by sonication. Then, the resulting reaction mixture is added to 1 ml of Disperbyk®-166 solution (from BYK), and then sonicated and stirred for 1 hour.

After the completion of the reaction, the mixture is centrifuged, and the supernatant is discarded. The precipitates are washed 2-3 times using deionized water, and dried by vacuum drying at room temperature for 24 hours to obtain the magnetic polymer microbeads with about 0.1 mmol/g of aldehyde groups on the surface.

EXAMPLE 4

Following the same procedure as Example 1, 1 g of polystyrene particles (prepared by dispersion polymerization), 20 ml of dimethyl sulfoxide (DMSO, the value of the polar parameter is 8.0 $(cal/cm^3)^{1/2}$, and the value of the hydrogen bonding parameter is 5.0 $(cal/cm^3)^{1/2}$), 120 ml of deionized water, and 0.1 g of sodium dodecyl sulfate are added to an Erlenmeyer flask under stirring, and then is left soaking for 15 hours at room temperature.

Subsequently, 10 ml of 19 mg/ml $Fe_3O_4$ magnetic nanoparticle solution prepared from Example 1 is added to the polystyrene particle solutions prepared above at 30° C. with stirring (at 140 rpm) for 24 hours in order to allow the magnetic nanoparticles to enter the interior of the polystyrene particles. Afterwards, the polystyrene particles are separated from the solution by centrifuging, sequentially washed with methanol and deionized water for several times, and dried by vacuum drying at room temperature for 1-2 days to obtain the magnetic polymer microbeads. The average particle diameter of the magnetic polymer microbeads is about 1.5 μm.

EXAMPLE 5

Following the same procedure as Example 1, seven separate sets of polystyrene solutions are prepared. Each set of polystyrene solutions is prepared as following: 0.5 g of polystyrene particles (prepared by dispersion polymerization), 10 ml of N-methyl-2-pyrrolidone, 60 ml of deionized water, and 0.05 g of sodium dodecyl sulfate are added to an Erlenmeyer flask under stirring, and then is left soaking for 15 hours at room temperature.

Subsequently, 10 ml of 1.4, 2.8, 3.4, 10, 13, 19, and 24 mg/ml $Fe_3O_4$ magnetic nanoparticle solution prepared from Example 1 is respectively added to the seven separate polystyrene solutions prepared above at 30° C. with stirring (at 140 rpm) for 24 hours in order to allow the magnetic nanoparticles to enter the interior of the polystyrene particles. Afterwards, the polystyrene particles are separated from the solution by centrifuging, sequentially washed with methanol and deionized water for several times, and dried by vacuum drying at room temperature for 1-2 days to obtain the magnetic polymer microbeads. The saturation magnetization of the magnetic polymer microbeads obtained from the magnetization curves for the seven cases (respectively corresponding to using 1.4, 2.8, 3.4, 10, 13, 19, and 24 mg/ml $Fe_3O_4$ magnetic nanoparticle solution) is respectively 0.5, 1.1, 1.5, 4.7, 7.9, 8.4, and 13.0 emu/g. It is found that the magnetization of the obtained the magnetic polymer microbeads is proportional to the concentration of the magnetic nanoparticle solution. Accordingly, with an increase in the concentration of the magnetic nanoparticle solution, the amount of the magnetic nanoparticles which can enter the interior of the polystyrene particles increases. When the saturation magnetization of the magnetic polymer microbeads is 13.0 emu/g, the content of the $Fe_3O_4$ magnetic nanoparticles encapsulated in the polystyrene particles is about 38% by weight measured by specific gravity bottle method.

EXAMPLE 6

Following the same procedure as Example 1, 0.2 g of polystyrene particles (prepared by dispersion polymerization), 4 ml of N-methyl-2-pyrrolidone, 20 ml of deionized water, and 0.02 g of sodium dodecyl sulfate are added to an Erlenmeyer flask under stirring, and then is left soaking for 15 hours at room temperature.

Subsequently, 36 mg of magnetic carbon nanocapsules powder (Fe-filled carbon nanocapsules obtained from Industrial Technology Research Institute, Taiwan) is added to the polystyrene solution prepared above at 30° C. with stirring (at 140 rpm) for 24 hours in order to allow the magnetic carbon nanocapsules to enter the interior of the polystyrene particles. Afterwards, the polystyrene particles are separated from the solution by centrifuging, sequentially washed with methanol and deionized water for several times, and dried by vacuum drying at room temperature for 1-2 days to obtain the magnetic polymer microbeads. The scanning electron micrograph of the magnetic polymer microbeads of this embodiment shows that the particles are spherical, and the average particle diameter is about 1.4 μm.

EXAMPLE 7

Figure 5:
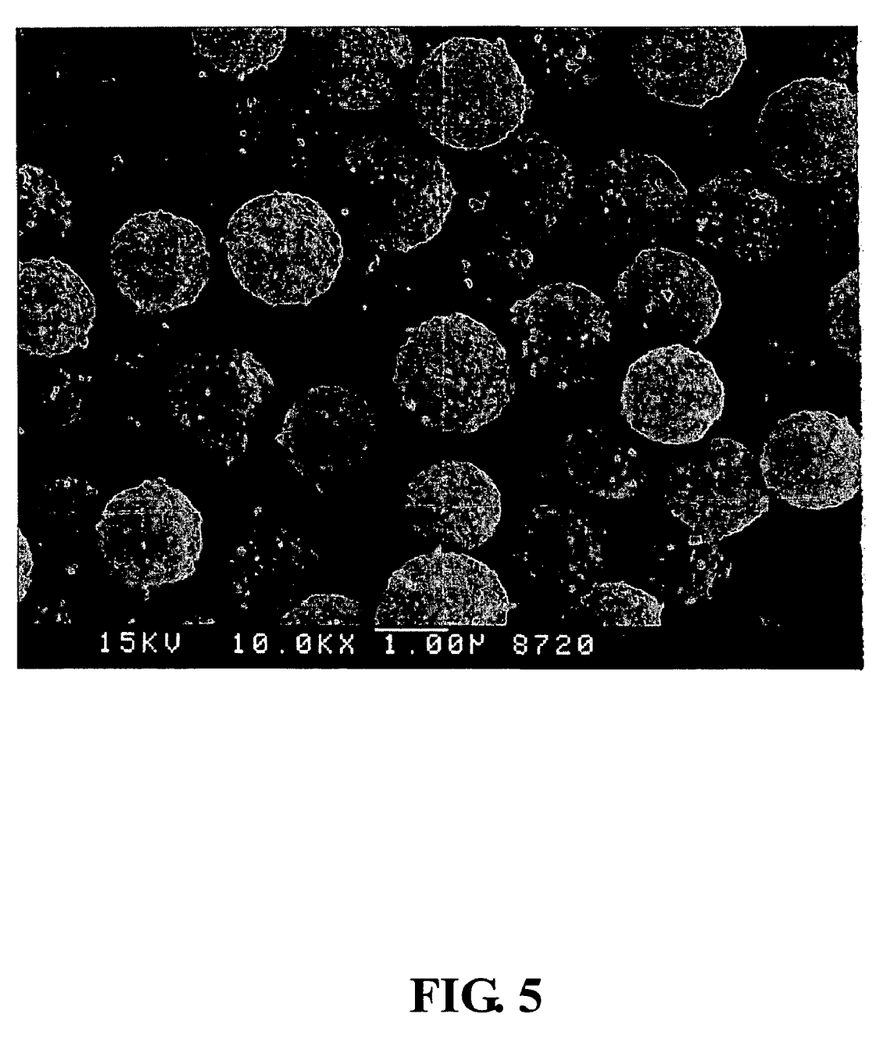
FIG. 5 shows the scanning electron micrograph with magnification of 10,000 times taken from the magnetic polymer microbeads according to another embodiment (Example 7) of the present invention, and it shows that the microbeads are spherical, and the distribution of the particle diameters is quite narrow.

Four sets of the magnetic polymer microbeads with the saturation magnetization of 13.0 emu/g prepared from Example 5 are respectively immersed in 0.5, 1, 1.5, and 2 N HCl for 20 minutes. The measured saturation magnetization for the four sets is respectively 11.5, 11.0, 10.9, and 10.9 emu/g (respectively corresponding to immersion in 0.5, 1, 1.5, and 2 N HCl). The results show that only small amount of the magnetic nanoparticles are adsorbed on the surfaces of the polymer particles, and the adsorbed magnetic nanoparticles are readily dissolved in HCl solution and washed away. Most of the magnetic nanoparticles can diffuse in the interior of the polymers and are entrapped therein. FIG. 5 shows the scanning electron micrograph of the magnetic polymer microbeads after immersing in 0.5 N HCl for 20 minutes.

EXAMPLE 8

Following the same procedure as Example 1, five separate sets of poly(styrene-glycidyl methacrylate) (PS-GMA) solutions are prepared. Each set of PS-GMA solutions is prepared as following: 0.5 g of poly(styrene-glycidyl methacrylate) particles (prepared by dispersion polymerization), 10 ml of N-methyl-2-pyrrolidone, 60 ml of deionized water, and 0.05 g of sodium dodecyl sulfate are added to an Erlenmeyer flask under stirring, and then is left soaking for 15 hours at room temperature.

Figure 6:
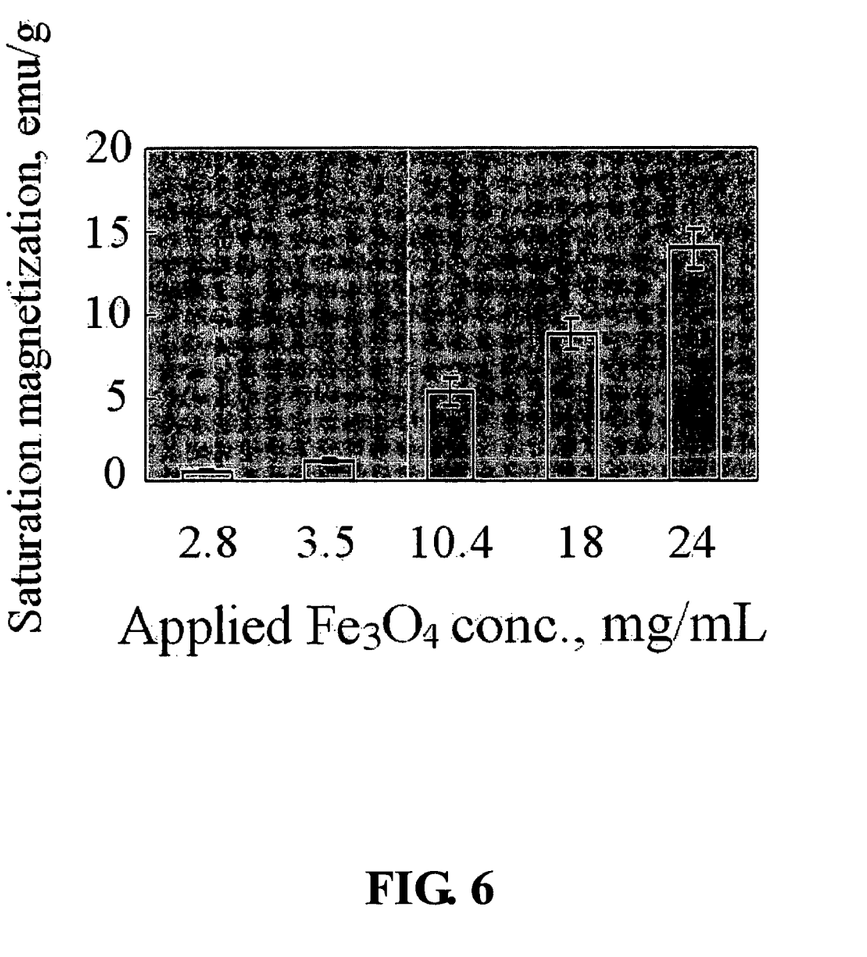
FIG. 6 shows the plot of the saturation magnetization of the magnetic polymer microbeads versus the concentrations of the magnetic nanoparticle solutions for immersing according to the present invention.
Figure 7:
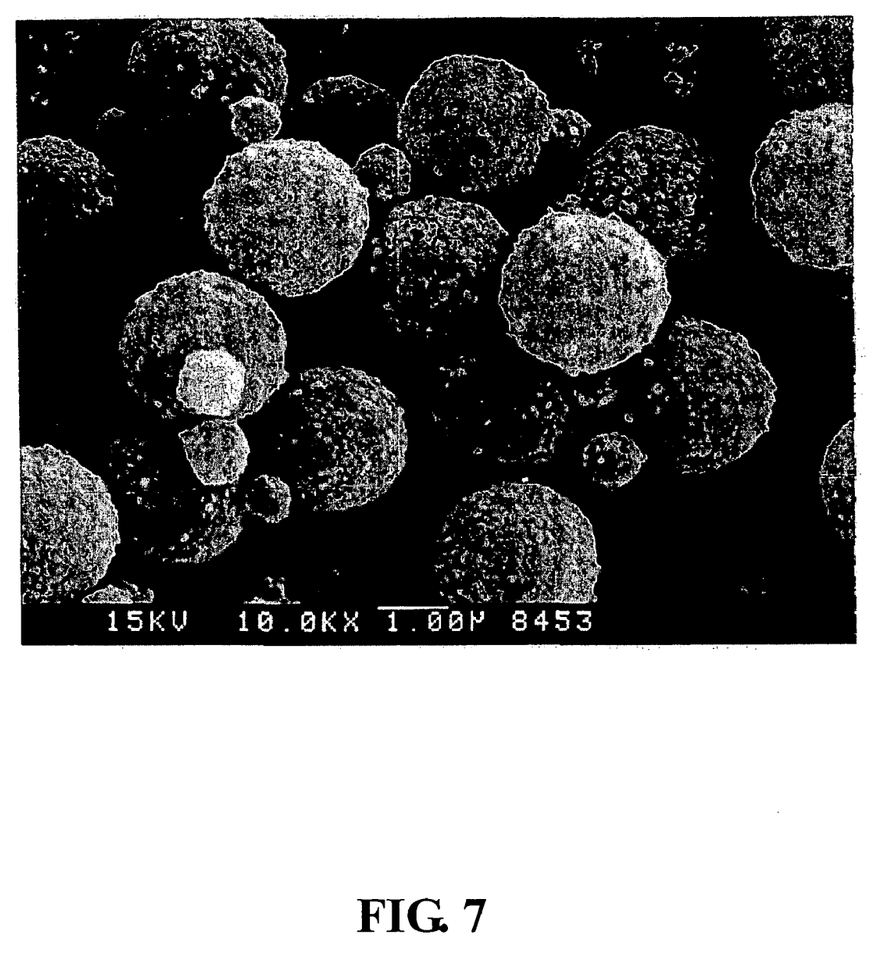
FIG. 7 shows the scanning electron micrograph with magnification of 10,000 times taken from the magnetic polymer microbeads according to yet another embodiment (Example 8) of the present invention, and it shows that the microbeads are spherical, and the distribution of the particle diameters is quite narrow.

Subsequently, 5 ml of 2.8, 3.5, 10.4, 18, and 24 mg/ml $Fe_3O_4$ magnetic nanoparticle solution prepared from Example 1 is respectively added to the five separate PS-GMA solutions prepared above at 30° C. with stirring (at 140 rpm) for 24 hours in order to allow the magnetic nanoparticles to enter the interior of the PS-GMA particles. Afterwards, the PS-GMA particles are separated from the solution by centrifuging, sequentially washed three times with methanol and three times with deionized water, and dried by vacuum drying at room temperature for 1-2 days to obtain the magnetic polymer microbeads. The saturation magnetization of the magnetic polymer microbeads obtained from the magnetization curves for the five cases (respectively corresponding to using 2.8, 3.5, 10.4, 18, and 24 mg/ml $Fe_3O_4$ magnetic nanoparticle solution) is respectively 0.6, 1.2, 5.0, 8.6, and 13.7 emu/g (average values of three repeated experiments). It is found that the magnetization of the obtained the magnetic polymer microbeads is proportional to the concentration of the magnetic nanoparticle solution, as shown in FIG. 6. FIG. 7 shows the scanning electron micrograph of the magnetic polymer microbeads with the highest magnetization according to this embodiment, and the average particle diameter of the magnetic polymer microbeads is about 2.34 μm.

The magnetic polymer microbeads prepared above have the surface epoxy groups which can bond to various biomolecules. The surface epoxy groups can be modified by conventional chemical reactions so that the magnetic polymer microbeads can have different functional groups, such as carboxyl groups, aldehyde groups, amino groups, hydroxyl groups, or the like.

EXAMPLE 9

0.5 g of poly(styrene-glycidyl methacrylate) (PS-GMA) submicron particles, 10 ml of N-methyl-2-pyrrolidone, 60 ml of deionized water, and 0.1 g of sodium dodecyl sulfate are added to an Erlenmeyer flask under stirring, and then is left soaking for 15 hours at room temperature.

The poly(styrene-glycidyl methacrylate) submicron particles are prepared by copolymerizing glycidyl methacrylate and styrene (the molar ratio is 5:100) in the presence of potassium persulfate as an initiator using the emulsifier-free emulsion polymerization.

Subsequently, 5 ml of 24 mg/ml $Fe_3O_4$ magnetic nanoparticle aqueous solution is added to the PS-GMA solution prepared above at 30° C. with stirring (at 140 rpm) for 24 hours in order to allow the magnetic nanoparticles to enter the interior of the PS-GMA particles.

Figure 8:
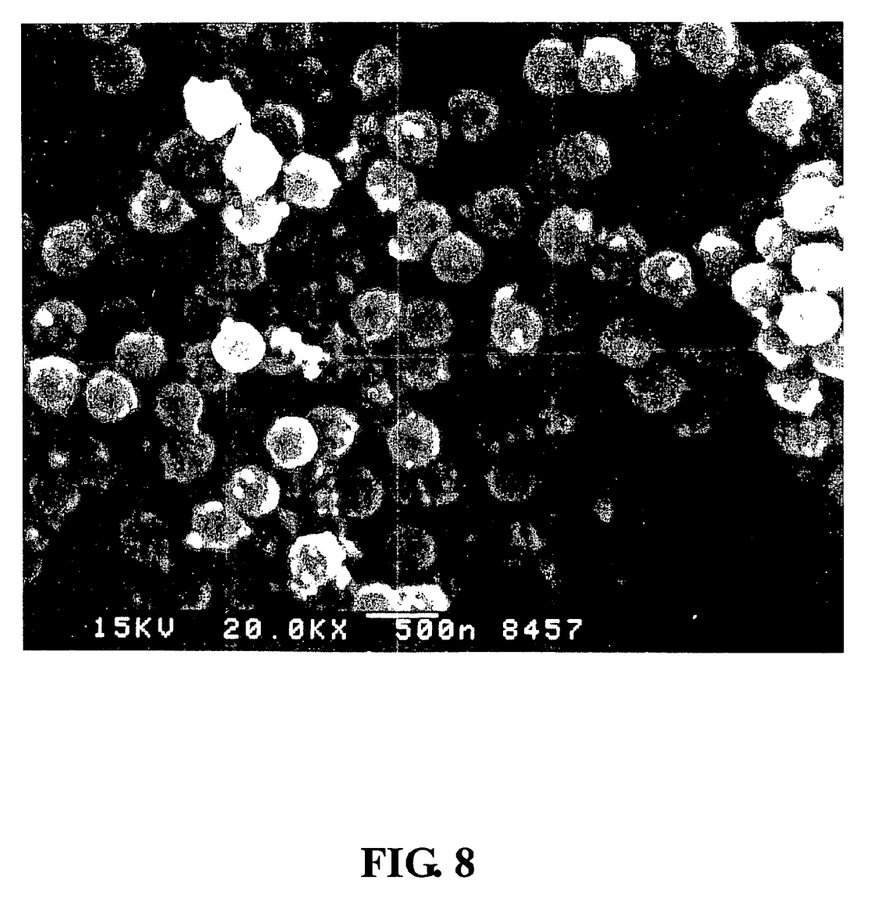
FIG. 8 shows the scanning electron micrograph with magnification of 20,000 times taken from the magnetic polymer microbeads according to still another embodiment (Example 9) of the present invention, and it shows that the microbeads are spherical, and the distribution of the particle diameters is quite narrow.
Figure 9:
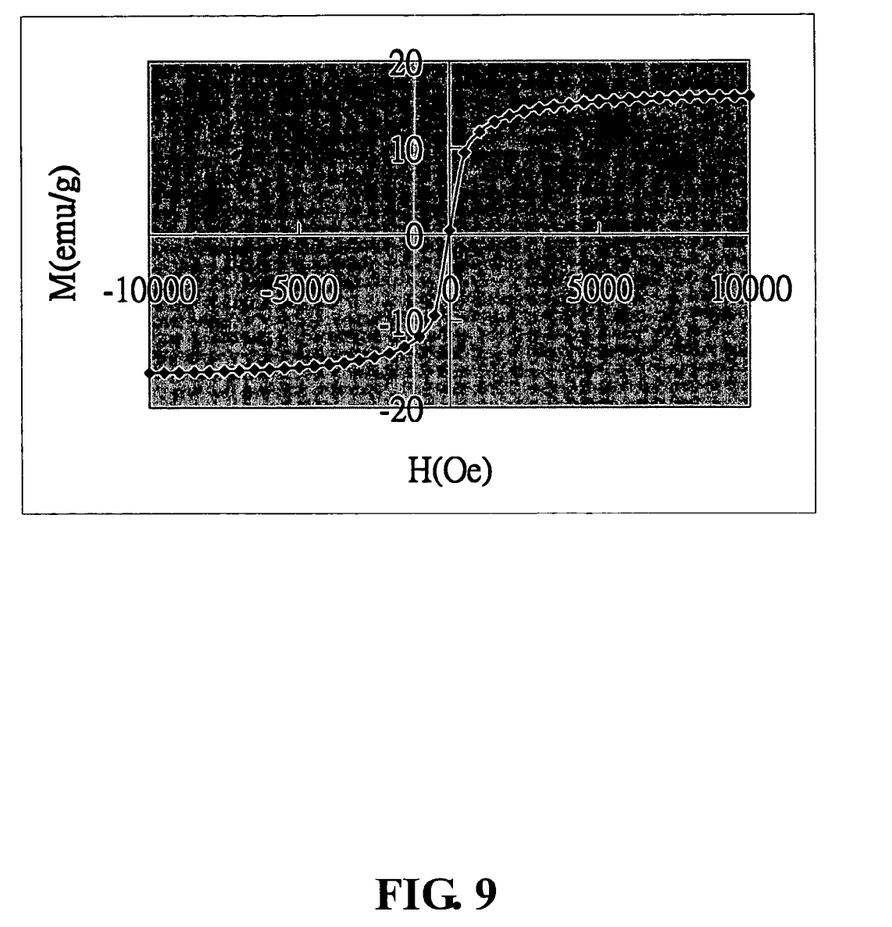
FIG. 9 shows the magnetization curve of the magnetic polymer microbeads shown in FIG. 8.

Afterwards, the PS-GMA submicron particles are separated from the solution by centrifuging, sequentially washed three times with methanol and three times with deionized water, and dried by vacuum drying at room temperature for 1-2 days to obtain the magnetic polymer microbeads. FIG. 8 shows the scanning electron micrograph of the magnetic polymer microbeads according to this embodiment. The average particle diameter of the magnetic polymer microbeads is about 0.38 μm. FIG. 9 shows the magnetization curve of the magnetic polymer microbeads, and the saturation magnetization are found to be up to 16 emu/g.

The magnetic polymer microbeads prepared above have the surface epoxy groups which can bond to various biomolecules. The surface epoxy groups can be modified by conventional chemical reactions so that the magnetic polymer microbeads can have different functional groups, such as carboxyl groups, aldehyde groups, amino groups, hydroxyl groups, or the like.

EXAMPLE 10

Following the same procedure as Example 9, four separate sets of PS-GMA solutions are prepared. Each set of PS-GMA solutions is prepared as following: 0.5 g of poly(styrene-glycidyl methacrylate) (PS-GMA) submicron particles, 10 ml of N-methyl-2-pyrrolidone, 60 ml of deionized water, and 0.1 g of sodium dodecyl sulfate are added to an Erlenmeyer flask under stirring, and then is left soaking for 15 hours at room temperature. Subsequently, 5 ml of 2.8, 3.5, 10, and 18 mg/ml $Fe_3O_4$ magnetic nanoparticle solution prepared from Example 1 is respectively added to the four separate PS-GMA solutions prepared above at 30° C. with stirring (at 140 rpm) for 24 hours in order to allow the magnetic nanoparticles to enter the interior of the PS-GMA submicron particles. Afterwards, the PS-GMA submicron particles are separated from the solution by centrifuging, sequentially washed three times with methanol and three times with deionized water, and dried by vacuum drying at room temperature for 1-2 days to obtain the magnetic polymer microbeads. The saturation magnetization of the magnetic polymer microbeads obtained from the magnetization curves for the four cases (respectively corresponding to using 2.8, 3.5, 10, and 18 mg/ml $Fe_3O_4$ magnetic nanoparticle solution) is respectively 0.3, 1.2, 4.9, and 8.7 emu/g. It is found that the magnetization of the obtained the magnetic polymer submicrobeads is proportional to the concentration of the magnetic nanoparticle solution.

EXAMPLE 11

0.25 g of the magnetic polymer microbeads with the saturation magnetization of 13.7 emu/g prepared from Example 8 are added to a mixed solution of 18 ml methanol and 0.2 g ethylenediamine, then fully dispersed by sonication, and then placed in a shaker bath for incubation at 65° C. and 125 rpm for 24 hours. The reaction is then terminated by cooling, and the product is sequentially washed twice with methanol and twice with deionized water, and oven-dried to obtain the magnetic polymer microbeads with amino groups on the surface.

Figure 10:
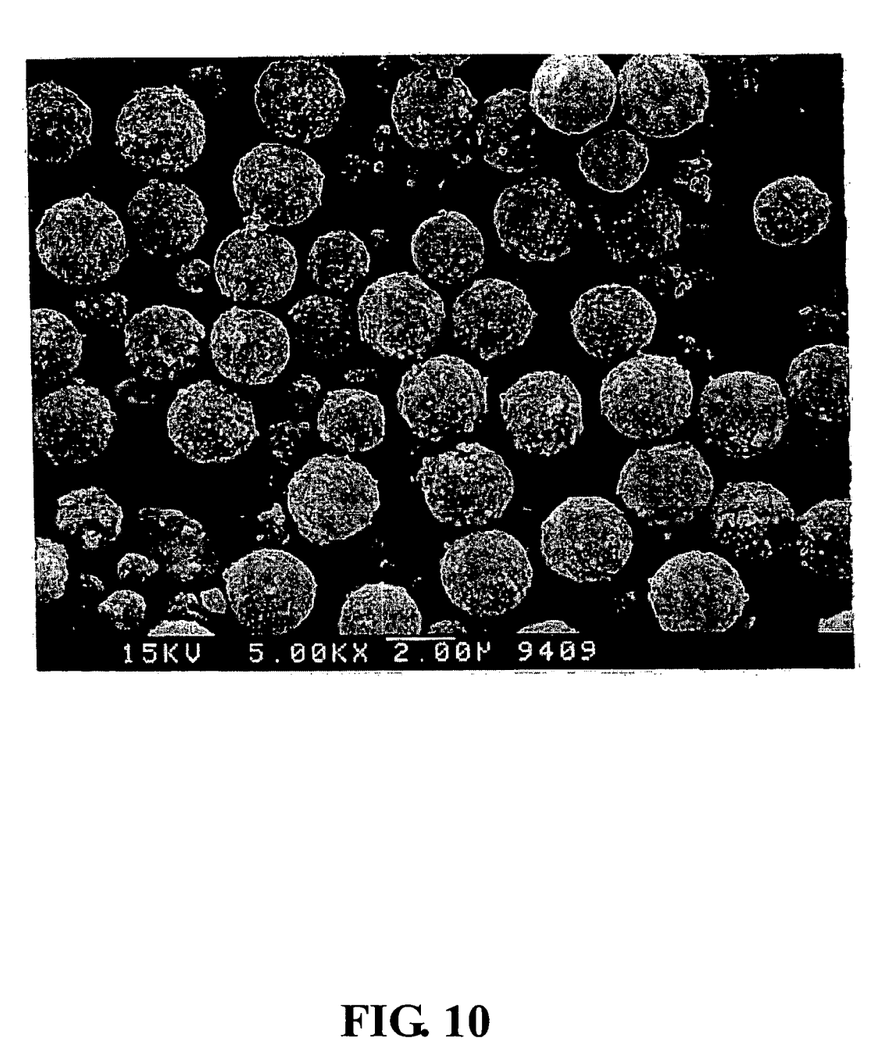
FIG. 10 shows the scanning electron micrograph with magnification of 5,000 times taken from the magnetic polymer microbeads according to further another embodiment (Example 11) of the present invention.

0.1 g of the amino group-containing magnetic polymer microbeads are added to a mixture of 10 methanol and 0.2 g succinic anhydride, fully dispersed by sonication, then introducing nitrogen gas therein, placed in a shaker bath for reaction at 50° C. and 125 rpm for 48 hours, washed twice with methanol, and then dried to obtain the magnetic polymer microbeads having surface carboxyl groups. The saturation magnetization of the magnetic polymer microbeads becomes 10.7 emu/g. FIG. 10 shows the scanning electron micrograph of the magnetic polymer microbeads having surface carboxyl groups.

EXAMPLE 12

1 g of the magnetic polymer microbeads prepared from Example 8 are added to a mixed solution of 18 ml methanol and 2 g ethylenediamine, then fully dispersed by sonication, and then placed in a shaker bath for incubation at 65° C. and 125 rpm for 24 hours. The reaction is then terminated by cooling, and the product is sequentially washed twice with methanol and twice with deionized water, and oven-dried to obtain the magnetic polymer microbeads having surface amino groups. Subsequently, 0.5 g of the magnetic polymer microbeads having surface amino groups and 25 ml of glutaraldehyde are mixed together, allowed for reaction at the room temperature for 24 hours. Afterwards, they are washed three times with deionized water, and oven-dried to obtain the magnetic polymer microbeads with surface aldehyde groups. The density of aldehyde groups is about 0.09 mmol/g.

EXAMPLE 13

As Example 8, two separate sets of PS-GMA solutions are prepared. For one set, 0.5 g of poly(styrene-glycidyl methacrylate) particles (prepared by dispersion polymerization), 10 ml of dimethyl sulfoxide, (the value of the polar parameter is 8.0 $(cal/cm^3)^{1/2}$, and the value of the hydrogen bonding parameter is 5.0$(cal/cm^3)^{1/2}$), 60 ml of deionized water, and 0.05 g of sodium dodecyl sulfate are added to an Erlenmeyer flask under stirring, and then is left soaking for 15 hours at room temperature. For another set, 0.5 g of poly(styrene-glycidyl methacrylate) particles (prepared by dispersion polymerization), 10 ml of dimethyl formamide (the value of the polar parameter is 6.7 $(cal/cm^3)^{1/2}$, and the value of the hydrogen bonding parameter is 5.5 $(cal/cm^3)^{1/2}$), 60 ml of deionized water, and 0.05 g of sodium dodecyl sulfate are added to an Erlenmeyer flask under stirring, and then is left soaking for 15 hours at room temperature.

Subsequently, 5 ml of 24 mg/ml $Fe_3O_4$ magnetic nanoparticle solution prepared from Example 1 is added to each of the two PS-GMA solutions prepared above at 30° C. with stirring (at 140 rpm) for 24 hours in order to allow the magnetic nanoparticles to enter the interior of the PS-GMA particles. Afterwards, the PS-GMA particles are separated from the solution by centrifuging, washed three times with methanol and three times with deionized water, and dried by vacuum drying at room temperature for 1-2 days to obtain the magnetic polymer microbeads. The saturation magnetizations of the magnetic polymer microbeads are 8.4 emu/g (using DMSO), and 8.2 emu/g (using DMF). The content of the $Fe_3O_4$ magnetic nanoparticles encapsulated in the PS-GMA particles is 21% by weight measured by specific gravity bottle method for both cases (using DMSO and DMF).

It will be apparent to those skilled in the art that various modifications and variations can be made in the present invention without departing from the spirit or scope of the present invention. Thus, it is intended that the present invention cover the modifications and the variations of this invention provided they come within the scope of the appended claims and their equivalents.

What is claimed is:

1. A method for preparing magnetic polymer microbeads, comprising the following steps:
   (a) preparing polymer particles, and immersing the polymer particles into a solution in order to swell the polymer particles, wherein the polymer particles are made of polystyrene, or a copolymer including styrene as monomer, and the solution includes a medium polar solvent which allow the polymer particles to swell, but not to be dissolved therein, and allow the polymer particles to be evenly dispersed;
   (b) adding magnetic nanoparticles to the solution and allowing the magnetic nanoparticles to enter an interior of the polymer particles; and
   (c) separating the polymer particles from the solution,
   wherein the polymer particles are non-porous, or the pore size of the polymer particles is smaller than the particle diameter of the magnetic nanoparticles before swelling the polymer particles, and the magnetic nanoparticles can enter an interior of the polymer particles by molecular diffusion after swelling the polymer particles.

2. The method as claimed in claim 1, wherein a colloid solution containing the magnetic nanoparticles is added to the solution in the step (b).

3. The method as claimed in claim 2, wherein the colloid solution is miscible with the solution.

4. The method as claimed in claim 1, further comprising washing the magnetic polymer microbeads with methanol, or distilled water after the step (c).

5. The method as claimed in claim 1, wherein particle diameter of the polymer particles is between 0.1 μm and 100 μm.

6. The method as claimed in claim 1, wherein the copolymer further includes a vinyl monomer with at least one functional group.

7. The method as claimed in claim 6, wherein the at least one functional group is selected from the group consisting of carboxyl, hydroxyl, amino, aldehyde, and oxirane.

8. The method as claimed in claim 1, wherein the polymer particles are prepared by emulsion polymerization, emulsifier-free emulsion polymerization, dispersion polymerization, or suspension polymerization.

9. The method as claimed in claim 1, wherein a material of the magnetic nanoparticles is selected from the group consisting of iron oxide, ferromagnetic oxide, ferromagnetic nickel, ferromagnetic cobalt, iron-cobalt-nickel alloy, iron carbide, and iron-platinum alloy.

10. The method as claimed in claim 9, wherein the iron oxide is selected from the group consisting of $Fe_3O_4$, and $Fe_2O_3$.

11. The method as claimed in claim 9, wherein the ferromagnetic oxide is selected from the group consisting of $MnZnFe_2O_4$, and $NiZnFe_2O_4$.

12. The method as claimed in claim 11, wherein the solution includes a single solvent, or a mixture of several solvents, or a mixture of solvents and water, and the solution further includes sodium dodecyl sulfate.

13. The method as claimed in claim 11, wherein the solvent has a polar parameter of between 2 $(cal/cm^3)^{1/2}$ and 12 $(cal/cm^3)^{1/2}$, and a hydrogen bonding parameter of between 2 $(cal/cm^3)^{1/2}$ and 8 $(cal/cm^3)^{1/2}$.

14. The method as claimed in claim 13, wherein the solvent is a dipolar aprotic solvent.

15. The method as claimed in claim 14, wherein the dipolar aprotic solvent is selected from the group consisting of: dimethylsulfoxide, N-methyl-2-pyrrolidone, dimethylformamide, and dimethylacetamide.

16. The method as claimed in claim 1 wherein the magnetic polymer microbeads are further modified to have the predetermined surface functional groups.

17. The method as claimed in claim 1, wherein the polymer particles have predetermined surface functional groups.

18. The method as claimed in claim 1, wherein the magnetic polymer microbeads further includes polymer microbeads co-encapsulating quantum dots, carbon nanocapsules, dendrimers, or fluorescent molecules.

19. The method as claimed in claim 1, wherein the magnetic polymer microbeads are ferromagnetic, or superparamagnetic.

* * * * *